United States Patent
Komiya et al.

(10) Patent No.: US 8,052,312 B2
(45) Date of Patent: Nov. 8, 2011

(54) VEHICLE LIGHTING DEVICE

(75) Inventors: Koji Komiya, Saitama (JP); Mutsumi Katayama, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 399 days.

(21) Appl. No.: 12/366,074

(22) Filed: Feb. 5, 2009

(65) Prior Publication Data
US 2009/0237953 A1 Sep. 24, 2009

(30) Foreign Application Priority Data
Mar. 19, 2008 (JP) ................................. 2008-071333

(51) Int. Cl.
*B62J 6/02* (2006.01)
(52) U.S. Cl. .................... 362/544; 362/473; 362/475
(58) Field of Classification Search .................. 362/475, 362/473, 543, 544, 545, 241, 247
See application file for complete search history.

(56) References Cited

U.S. PATENT DOCUMENTS
1,247,454 A * 11/1917 Rizer ............................ 362/241
5,325,271 A    6/1994 Hutchisson 2002/0085389 A1   7/2002 Cheron et al.
2004/0105274 A1   6/2004 Pommeret et al.
2004/0208013 A1 * 10/2004 Dalton et al. ................ 362/488
2006/0256573 A1  11/2006 Pan FOREIGN PATENT DOCUMENTS
| EP | 1033525 | A2 | 9/2000 |
| EP | 1588895 | A2 | 10/2005 |
| JP | 2000-331509 | | 11/2000 |
| WO | 03021146 | A1 | 3/2003 |

OTHER PUBLICATIONS

European Search Report issued Apr. 26, 2010 for corresponding EP Application No. 09250374.7.

* cited by examiner

*Primary Examiner* — David V Bruce
(74) *Attorney, Agent, or Firm* — Squire, Sanders & Dempsey (US) LLP (57) ABSTRACT

A vehicle lighting device is provided to maintain a viewability of light even when seen from a diagonal direction having a predetermined angle to an irradiation direction of the lighting device. The vehicle lighting device includes a board, which includes an array of a plurality of light sources. The vehicle lighting device also includes wall portions that bulge in an irradiation direction of the light sources from edge surfaces of the board. The wall portions also form a polygon surrounding the board. At least one of the wall portions includes a reflective surface on a side facing the light sources.

30 Claims, 10 Drawing Sheets

REAR SIDE OF VEHICLE BODY

VEHICLE LIGHTING DEVICE

FIELD

Some embodiments discussed herein relate to a vehicle lighting device, and, more particularly, relates to a vehicle lighting device capable of maintaining viewability of light even when seen from a diagonal direction having a predetermined angle to an irradiation direction of the lighting device.

BACKGROUND

Generally a lighting device may be attached to a vehicle, such as a motorcycle, to emit light to an occupant of another vehicle, a pedestrian, and the like. Therefore, various structures have been studied in order to improve viewability of light and appearance design of the lighting device, and to reduce manufacturing cost thereof.

Patent Document 1 (Japanese Patent Application Publication No. 2000-331509) generally discusses a vehicle lighting device in which the number of light-emitting diodes appears to be greater than the actual number when the lighting device is seen from an irradiation side thereof by arranging multiple reflective surfaces in the circumference of a light source attachment surface to which the light-emitting diodes serving as light sources are attached.

When a viewer, such as an occupant of another vehicle or a pedestrian, sees a lighting device attached to a vehicle, the viewer likely sees the lighting device from directions other than the front even if the irradiation direction of the lighting device is directed to a front side of the vehicle body. For example, when a lighting device attached to the front of the vehicle body of a running vehicle is seen by an occupant of another vehicle running in the opposite lane, an angle of the lighting device with respect to the direction of the eyes of the occupant, who is looking straight ahead, of another vehicle sequentially changes. Specifically, as the distance between the two vehicles decreases, such an angle changes from approximately zero degrees where the two vehicles are sufficiently distant to approximately 90 degrees where the two vehicles pass each other. Meanwhile, when a pedestrian sees the lighting device attached to the front of the vehicle body of a stopped vehicle, the direction of the eyes of the pedestrian looking at the lighting device changes in accordance with a distance between the pedestrian and the vehicle. In this manner, the viewer likely sees the lighting device of the vehicle from a diagonal direction having a predetermined angle from the irradiation direction of the lighting device. Thus, the lighting device of the vehicle preferably has a configuration with which the viewability does not decrease even when seen diagonally.

Although the lighting device described in Patent Document 1 can make the number of light-emitting diodes appear to be greater than the actual number when seen from the front by arranging multiple reflective surfaces, Patent Document 1 does not take into consideration how the light-emitting diodes are seen from a diagonal direction.

SUMMARY

Some of the embodiments discussed herein provides a vehicle lighting device to solve the problem of the conventional technique described above and to maintain viewability of light even when seen from a diagonal direction having a predetermined angle to an irradiation direction of the lighting device.

According to one embodiment, a vehicle lighting device may include a board that can include a plurality of light sources to form an array. The vehicle lighting device may include wall portions configured to bulge in an irradiation direction of the light sources from edge surfaces of the board and to form a polygon surrounding the board. At least one of the wall portions may include a reflective surface on a side that can face the light sources.

According to another embodiment, a vehicle lighting device may include a board that can include a plurality of light sources to form an array. The vehicle lighting device may include four wall portions. The four wall portions may surround the board in an irradiation side of the light sources. The four wall portions may include a reflective surface on a side facing the plurality of light sources. Each of the light sources or at least one of the light sources may be configured to be arrayed in a matrix of one row by N columns. The reflective surface may include two horizontal surfaces which can vertically face each other in a row direction of the matrix. The reflective surface may also include two vertical surfaces which can horizontally face each other in a column direction of the matrix. The board may be configured to be substantially orthogonal to the reflective surfaces. A distance h6 can be set to not less than a distance S3 and a distance h5, when a distance between an edge of an upper one of the horizontal reflective surfaces and the light sources is the distance h5. The distance h6 can also be set to not less than a distance S3 and a distance h5, when a distance between an edge of a lower one of the horizontal reflective surfaces and the light sources is the distance h6. The distance h6 can also be set to not less than a distance S3 and a distance h5, when a distance between the upper reflective surface and the light sources is the distance S3. The distance h6 can also be set to not less than a distance S3 and a distance h5, when a distance between the lower reflective surface and the light sources is a distance S4. The horizontal reflective surfaces may also vertically face each other.

According to another embodiment, a vehicle lighting method can include providing a board. The board may include a plurality of light sources to form an array. The vehicle lighting method can also include configuring wall portions to bulge in an irradiation direction of the light sources from edge surfaces of the board and to form a polygon surrounding the board. The vehicle At least one of the wall portions can be configured to include a reflective surface on a side facing the plurality of light sources.

According to another embodiment, a vehicle lighting method may include providing a board. The board may include a plurality of light sources to form an array. The vehicle lighting method may include surrounding the board with four wall portions in an irradiation side of the light sources. Each of the four wall portions, or at least one of the four wall portions, may include a reflective surface on a side facing the plurality of light sources. The vehicle lighting method may also include configuring the plurality of light sources to be in a matrix of one row by N columns. The vehicle lighting method may include providing the reflective surface that can include two horizontal surfaces which vertically face each other in a row direction of the matrix. The reflective surface can include two vertical surfaces which horizontally face each other in a column direction of the matrix. The vehicle lighting method may include configuring the board to be substantially orthogonal to the reflective surfaces. The vehicle lighting method may include setting the distance h6 is set to not less than S3 and h5, when a distance between an edge of an upper one of the horizontal reflective surfaces and the light sources is the distance h5. The vehicle lighting method may include setting the distance h6 is set to not less than S3 and h5, when a distance between an edge of a lower one of the horizontal reflective surfaces and the light sources is the distance h6. The vehicle lighting method may include setting the distance h6 is set to not less than S3 and h5, when a distance between the upper reflective surface and the light sources is the distance S3. The vehicle lighting method may include setting the distance h6 is set to not less than S3 and h5, when a distance between the lower reflective surface and the light sources is a distance S4. The vehicle lighting method may include facing the horizontal reflective surfaces vertically to each other.

According to another embodiment, a vehicle lighting device can include a board means for providing a board that may include a plurality of light sources to form an array. The vehicle lighting device can include a wall portion means for providing wall portions that can be configured to a bulge in an irradiation direction of the light sources from edge surfaces of the board and to possibly form a polygon surrounding the board. At least one of the wall portions may include a reflective surface on a side facing the plurality of light sources.

According to another embodiment, a vehicle lighting device can include a board means for providing a board. The board may include a plurality of light sources to form an array. The vehicle lighting device may include a four wall portion means for surrounding the board in an irradiation side of the light sources. Each of the four wall portions means may include a reflective surface on a side facing the light sources. The vehicle lighting device may include light source means for configuring the plurality of light sources to be in a matrix of one row by N columns. The reflective surface can include two horizontal surfaces which vertically face each other in a row direction of the matrix. The reflective surface can include two vertical surfaces which horizontally face each other in a column direction of the matrix. The board may be configured to be substantially orthogonal to the reflective surfaces. A distance h6 can be set to not less than a distance S3 and a distance h5, when a distance between an edge of an upper one of the horizontal reflective surfaces and the light sources is the distance h5. The distance h6 can be set to not less than a distance S3 and a distance h5, when a distance between an edge of a lower one of the horizontal reflective surfaces and the light sources is the distance h6. The distance h6 can be set to not less than a distance S3 and a distance h5, when a distance between the upper reflective surface and the light sources is the distance S3. The distance h6 can be set to not less than a distance S3 and a distance h5, when a distance between the lower reflective surface and the light sources is a distance S4. The horizontal reflective surfaces may vertically face each other.

BRIEF DESCRIPTION OF THE DRAWINGS

Figure 1:
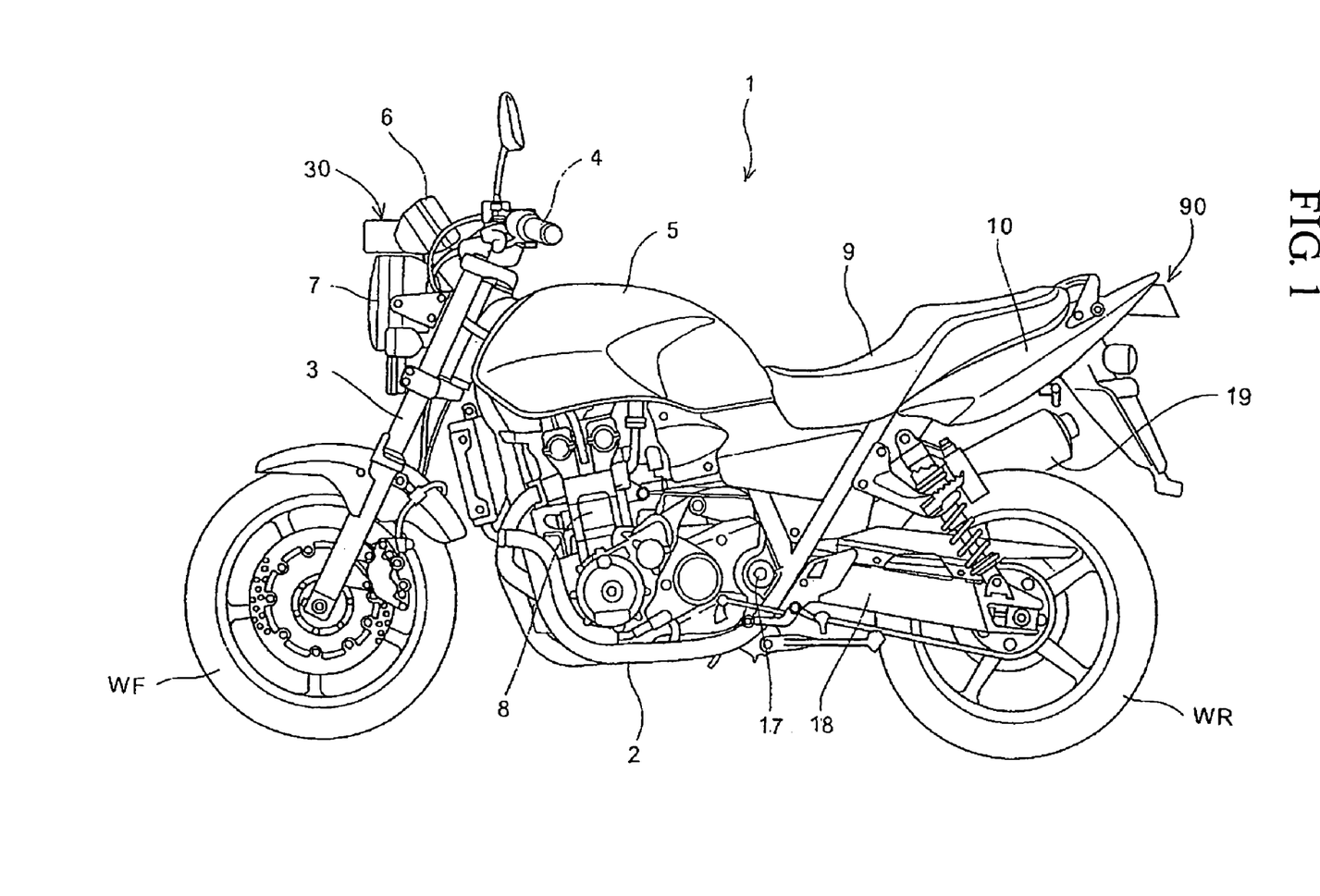
FIG. 1 is a side view of a motorcycle in which a lighting device is arranged according some of the embodiments discussed herein.

Hereinafter, some of the preferred embodiments will be described in detail with reference to the drawings. FIG. 1 illustrates a side view of a motorcycle 1 that may be arranged with a lighting device 30 according to one of the embodiments discussed herein and a lighting device 90 according to another embodiment discussed herein. On the front side of the vehicle body of a vehicle body frame 2, a pair of left and right front forks 3, which may pivotally support a front wheel WF to be rotatable, can be attached to be steerable by a steering handle 4. On the front side of the vehicle body of the steering handle 4, a meter unit 6 and a headlight 7 may be attached, and the lighting device 30 may be attached therebetween. The lighting device 30 may function as a signal lamp for notifying a viewer, such as an occupant of another vehicle or a pedestrian, of the presence of the motorcycle 1 by irradiation light of a light source such as a light-emitting diode. Note that one lighting device 30 may be provided in the center in the vehicle-width direction in an example of the drawing, but two or more thereof may be provided by attaching a left and right pair in the vehicle-width direction, for example.

An engine 8 serving as a driving source of the motorcycle 1 may be suspended in the vehicle body frame 2, and a fuel tank 5 may be arranged above the engine 8. On a lower rear portion of the vehicle body frame 2, a swing arm pivot 17 may be provided to pivotally support one end of a swing arm 18 to be swingable. The swing arm 18 may pivotally support a rear wheel WR, which serves as a drive wheel, to be rotatable. On the rear side of the vehicle body of the fuel tank 5, an occupant seat 9 may be attached, and a seat cowl 10 as an external part may be arranged below the occupant seat 9. Fuel gas from the engine 8 may be discharged from a muffler 19 via a discharge pipe extending to the rear side of the vehicle body. The lighting device 90 may be attached to an upper portion of a tail lamp device (not shown) at a rear end of the seat cowl 10. In the same manner as the lighting device 30 on the front side of the vehicle body, the lighting device 90 may also function as a signal lamp to notify an occupant of another vehicle, a pedestrian, and the like of the presence of the motorcycle 1. One or more light device 90 may be provided, with the rear side of the vehicle body set as the irradiation direction.

Figure 2:
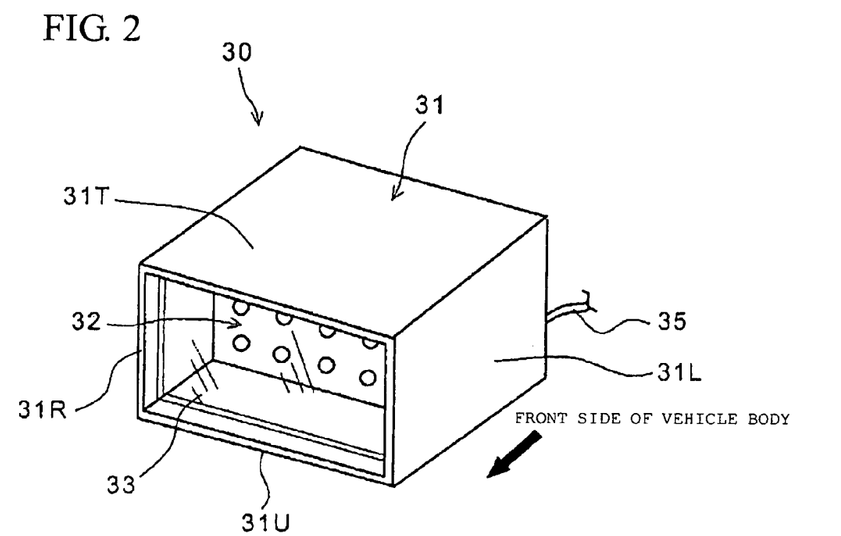
FIG. 2 is a perspective view of a lighting device according to one of the embodiments.
Figure 3:
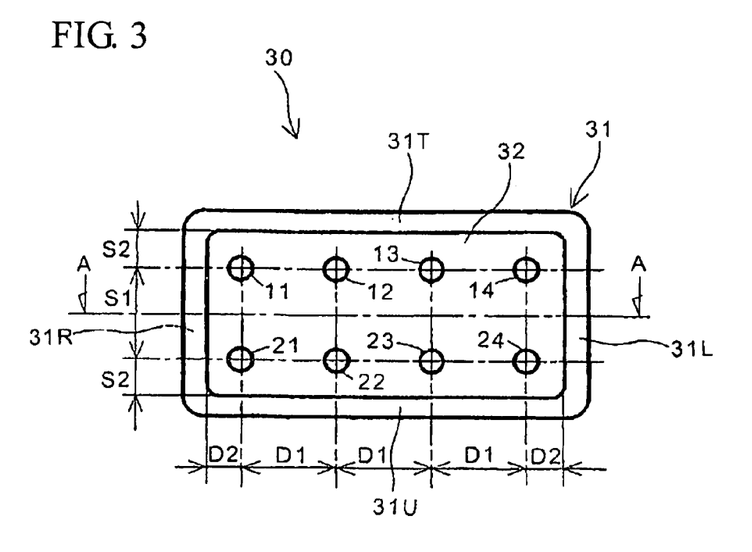
FIG. 3 is a front view of the lighting device.
Figure 4:
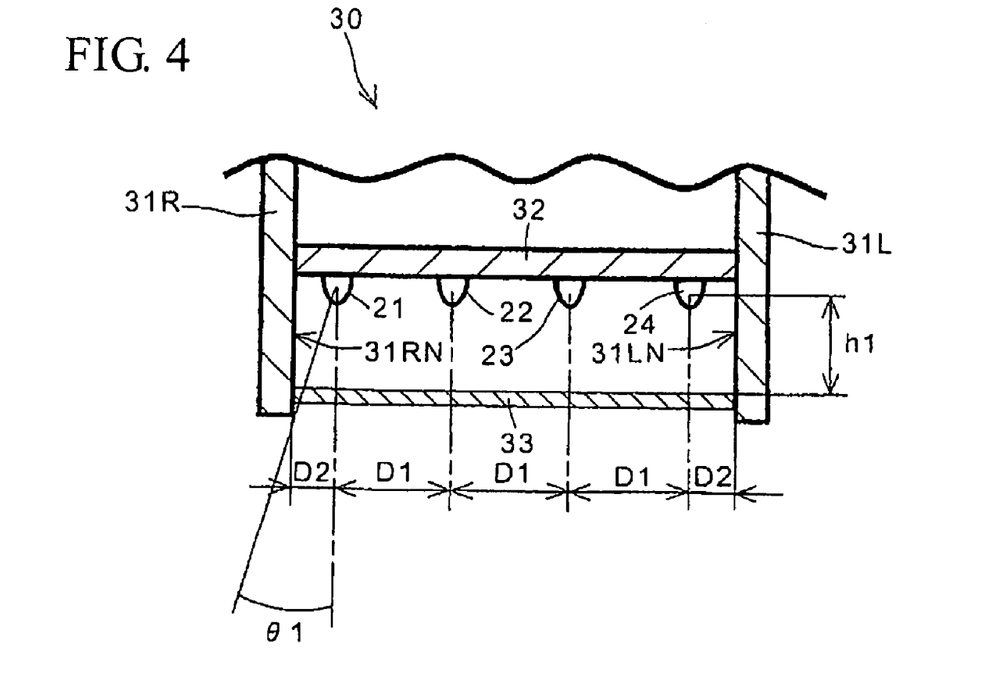
FIG. 4 is a sectional view taken along the line A-A of FIG. 3.

FIG. 2 illustrates a perspective view of the lighting device 30 according to one of the embodiments. FIG. 3 illustrates a front view of the lighting device 30, and FIG. 4 illustrates a sectional view taken along the line A-A of FIG. 3. The lighting device 30 may be configured such that a board 32, having multiple light sources can be arranged therein, may be held in a housing 31 formed of a plate-shaped resin or the like. In this embodiment, a light-emitting diode (LED) is used as the light source, but it may be configured of an incandescent light bulb or the like. Moreover, the color or intensity of directivity of the irradiation light of the light source can be desirably changed in accordance with the application or the like of the lighting device.

The housing 31 may be formed of an upper side wall portion 31T, a lower side wall portion 31U, a left side wall portion 31L, a right side wall portion 31R, and a rear side wall portion (not shown), which may be provided to surround the four sides of the board 32. The upper side wall portion 31T and the lower side wall portion 31U may form two horizontal surfaces facing each other vertically. The left side wall portion 31L and the right side wall portion 31R may form two vertical surfaces facing each other horizontally. As a result, a box shape may be formed with one surface of a rectangular solid being removed to provide an opening.

On the front side of the vehicle body of the housing 31, i.e., in the opening provided in the irradiation direction of the light source, a cover lens 33 which may prevent moisture, dust, and the like from entering into the housing 31 can be attached. The cover lens 33 may be formed of a colorless or colored transparent resin plate or the like, and may cause the irradiation light of the light source to be transmitted without being bent. In this embodiment, the board 32 may be arranged orthogonal to the four walls, and a distance between each light source and the cover lens 33 can be h1. On the rear side wall portion of the housing 31, a wire 35, which may supply a power supply to the light sources, can be attached.

An aspect of the lighting device 30 according to this embodiment is that, in the four wall portions 31T, 31U, 31L, and 31R, inner wall surfaces of parts bulging toward the side of the irradiation direction of the light sources from edge surfaces of the board 32, i.e., surfaces on the light source side, may be reflective surfaces 31TN, 31UN, 31LN, and 31RN (see FIGS. 4 and 7) which can reflect all light. The reflective surfaces are preferably mirror-finished by a method such as plating or metal deposition.

In the board 32, light sources 11, 12, 13, 14, 21, 22, 23, and 24 formed of a total of eight light-emitting diodes may be arrayed in a matrix of two rows by four columns. The light sources in the same row may be arranged at equal intervals each having a distance D1. A distance between each light source at row ends and its adjacent reflective surface may be a distance D2. Meanwhile, the light sources in the same column may be arranged at intervals of a distance S1. A distance between each light source at column ends and its adjacent reflective surface may be a distance S2.

As illustrated in FIG. 3, the light device 30 may appear when seen from the front of the vehicle. However, when seen from a diagonal direction on the left or right while moving in the horizontal direction from the front of the vehicle, the light sources at the column ends may be blocked by the wall portions and may become invisible at a point where the angle exceeds a certain degree. FIG. 4 illustrates a case where the light sources 11 and 21 at the column ends on the left side in the drawing are blocked by the right side wall portion 31R and cannot be seen. This may occur when an angle formed by the lighting device 30 and the viewpoint of a viewer exceeds an angle θ1.

Figure 5:
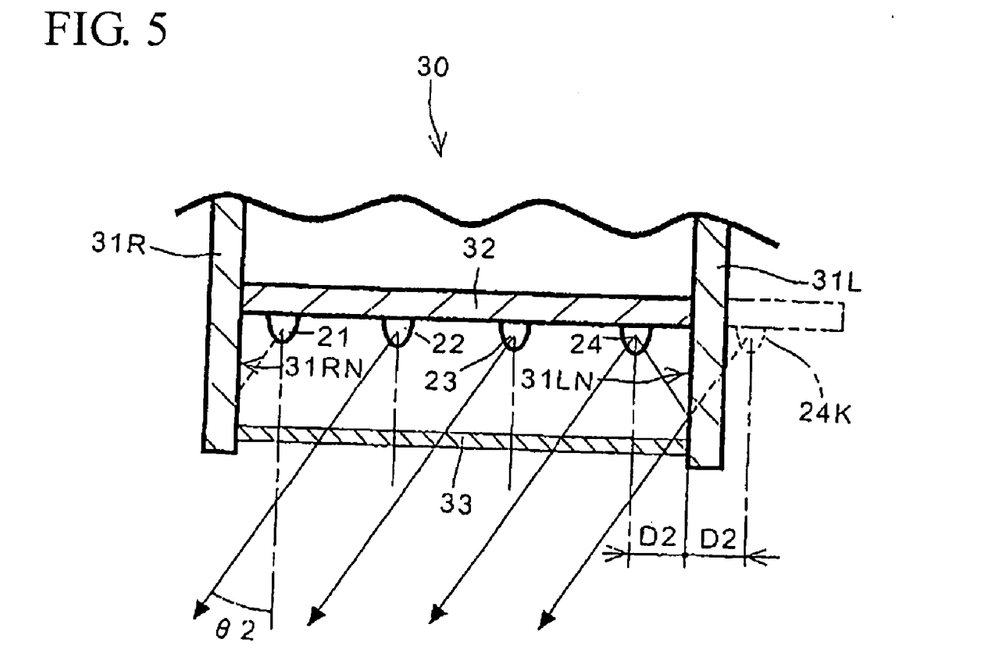
FIG. 5 is an illustrative view showing a state where an angle formed by the lighting device and a viewpoint of a viewer is a predetermined angle θ2 greater than an angle θ1.
Figure 6:
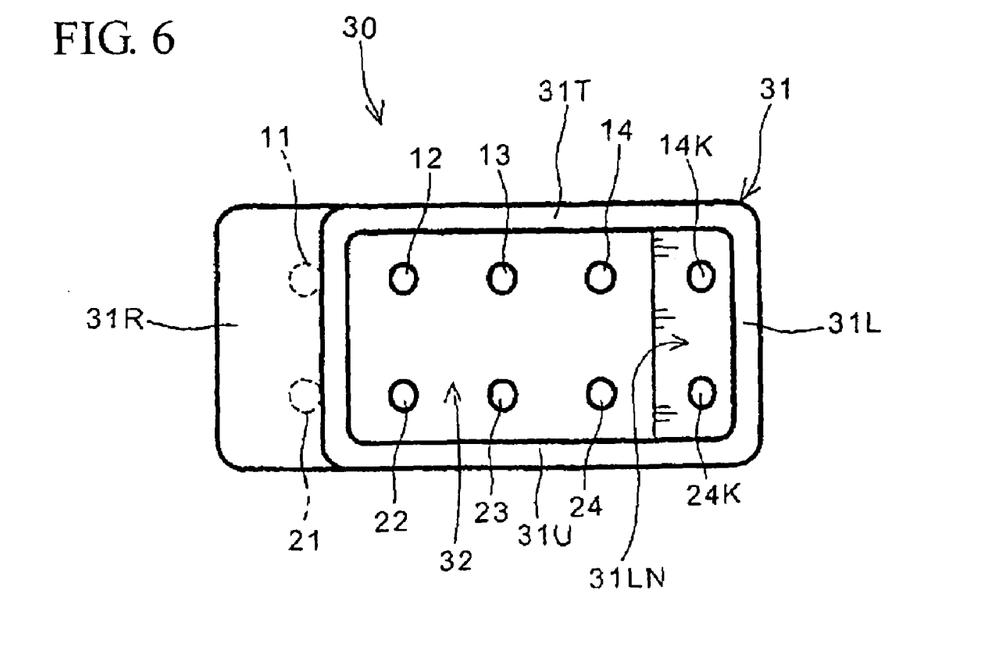
FIG. 6 is a perspective view showing how the lighting device is seen diagonally from the front right.

FIG. 5 is an illustrative view that illustrates a state where the angle formed by the lighting device 30 and the viewpoint of the viewer may be a predetermined angle θ2 greater than the angle θ1. FIG. 6 is a perspective view that illustrates how the lighting device 30 can be seen diagonally from a front right position at the predetermined angle θ2. In this case, the light sources 11 and 21 at the column ends on the left side in the drawing are hidden by the right side wall portion 31R and cannot be seen. However, reflected images 14K and 24K can be seen by the light sources 14 and 24 at the column ends on the right side in the drawing being reflected on the reflective surface 31LN of the left side wall portion 31L. Thereby, it may appear to the viewer of the lighting device 30 as though the number of the light sources was eight which is the same number as that arranged in the board. The drawing illustrates an example of a case where the lighting device 30 may be seen diagonally from the front right, but the same applies when seen diagonally from the front left.

At this time, if the distance D2 is set to a length of one half (½) of the distance D1, the distance between the light source 14 and the reflected image 14K (distance between the light source 24 and the reflected image 24K) can approximate the distance D1. In this embodiment, by setting the distance D2 to be (⅓)×D1 or greater and (⅔)×D1 or less, it can appear as though the light sources were arranged at equal intervals throughout the entire row even when the viewer sees the lighting device 30 diagonally from the front. Accordingly, the viewer is prevented from feeling a sense of incongruity.

Note that, in a state before the angle formed by the lighting device 30 and the viewpoint of the viewer exceeds the angle θ1, the reflective surface 31LN almost may not be seen from the viewer. Thus, even if the irradiation light of the light sources 14 and 24 is reflected on the reflective surface 31LN, it may not be seen from the viewer.

Figure 7:
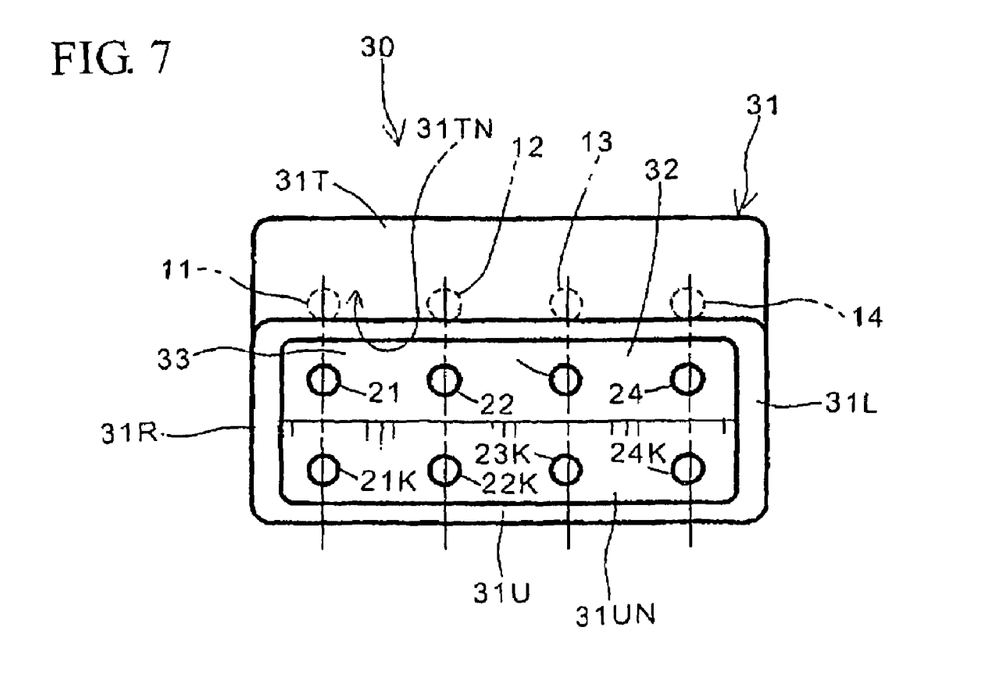
FIG. 7 is a perspective view showing how the lighting device is seen diagonally from above.

FIG. 7 illustrates a perspective view that shows how the lighting device 30 is seen diagonally from the front and above in such a way that the lighting device 30 and the viewpoint of the viewer may form a predetermined angle. In this case, the light sources 11, 12, 13, and 14 of the row on the upper side in the drawing may be hidden by the upper side wall portion 31T and may not be seen. However, reflected images 21K, 22K, 23K, and 24K can be seen by the light sources 21, 22, 23, and 24 of the row on the lower side in the drawing being reflected on the reflective surface 31UN of the lower side wall portion 31U. Thereby, it may appear to the viewer of the lighting device 30 as though the number of the light sources was eight which is the same number as that arranged in the board. The appearance may also apply in the same manner as when the lighting device 30 is seen diagonally from below.

At this time, if the distance S2 is set to a length of one half (½) of the distance S1, the distance between the light source 21 and the reflected image 21K (the same applies for other light sources) can approximate the distance S1. In this embodiment, by setting the distance S2 to be (⅓)×S1 or greater and (⅔)×S1 or less, it can appear to the viewer as though the light sources were arranged at equal intervals throughout the entire column even when the viewer sees the lighting device 30 diagonally from above. Accordingly, the viewer can be prevented from feeling a sense of incongruity.

Note that, even if the number of light sources arranged in the board 32 is increased, e.g., a matrix of 3 rows by 5 columns is formed, the ways of appearance of the actual image of the light source at the column end and the reflected image thereof and the ways of appearance of the actual image of the light source at the row end and the reflected image thereof may not change.

Figure 8:
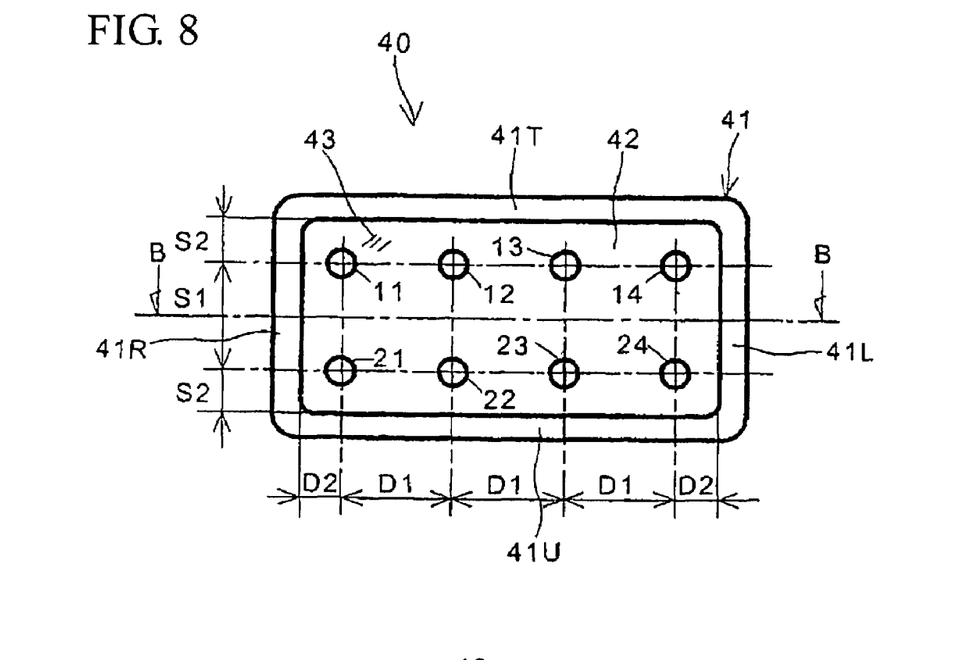
FIG. 8 is a front view of a lighting device according to a first modified example of one of the embodiment discussed herein.
Figure 9:
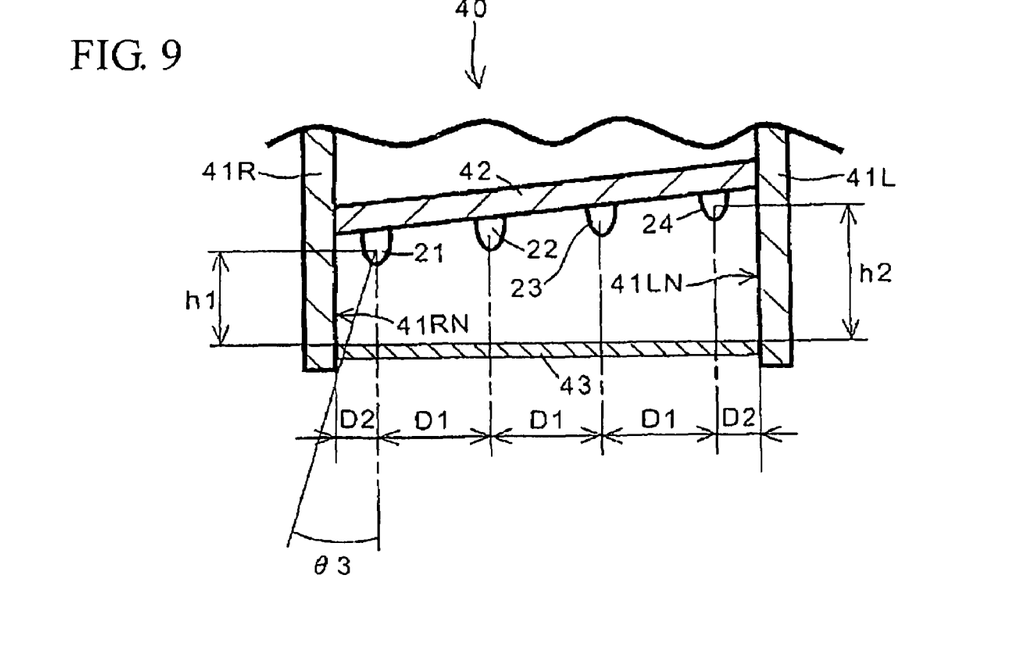
FIG. 9 is a sectional view taken along the line B-B of FIG. 8.

FIG. 8 illustrates a front view of a lighting device 40 according to a first modified example of the embodiment discussed herein. FIG. 9 illustrates a sectional view taken along the line B-B of FIG. 8. The same reference numerals as those described above denote the same or equivalent parts. The shapes and the like of wall portions 41T, 41U, 41L, and 41R forming a housing 41, reflective surfaces formed in the respective four wall portions, and a cover lens 43 may be the same as those of the lighting device 30 of the above-described embodiment. In this modified example, a board 42 may be attached to be inclined with respect to the right side wall portion 41R and the left side wall portion 41L. Accordingly, a distance h2 between the light source 14 or 24 and the cover lens 43 may be greater than a distance h1 between the light source 11 or 21 and the cover lens 43. In this modified example, as shown in FIG. 9, the light sources 11 and 21 at the column ends on the left side in the drawing may be blocked by the right side wall portion 41R and may not be seen when an angle formed by the lighting device 40 and the viewpoint of the viewer exceeds an angle θ3.

Figure 10:
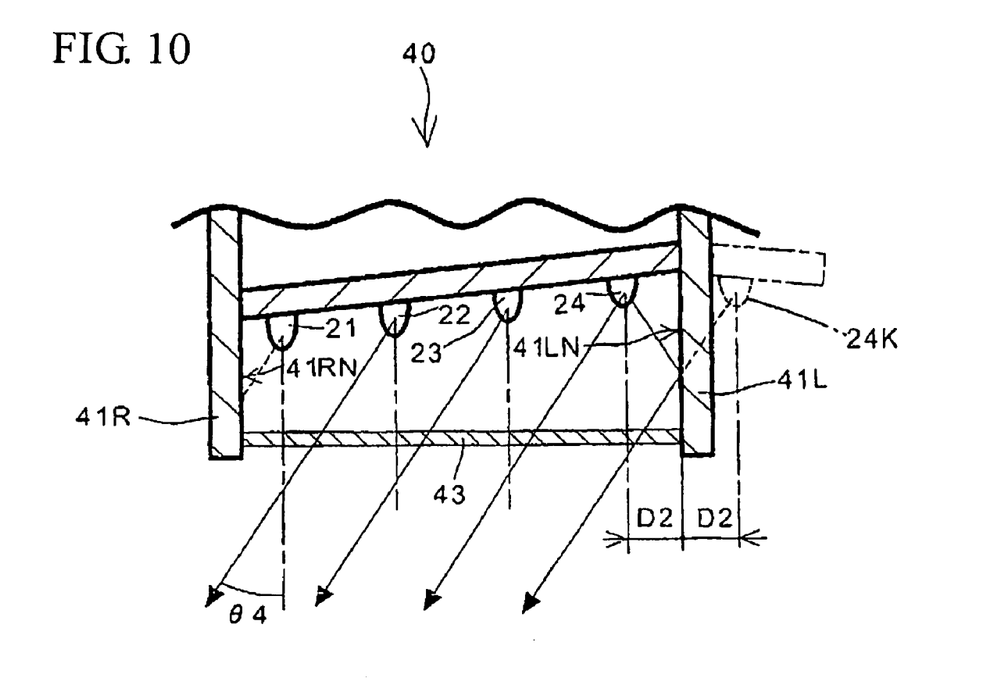
FIG. 10 is an illustrative view showing a state where the angle formed by the lighting device and the viewpoint of the viewer is an angle θ4 greater than an angle θ3.

FIG. 10 illustrates a state where the angle formed by the lighting device 40 and the viewpoint of the viewer can be an angle θ4 greater than the angle θ3. In this case, the light sources 11 and 21 at the column ends on the left side in the drawing can be hidden by the right side wall portion 41R and may not be seen. However, reflected images 14K and 24K can be seen by the light sources 14 and 24 at the column ends on the right side in the drawing being reflected on a reflective surface 41LN of the left side wall portion 41L. As a result, it may appear to the viewer of the lighting device 40 as though the number of light sources were eight, which may be the same number as that arranged in the board. This may result in the light sources 14 and 24 on the right side in the drawing to be hidden by the left side wall portion 41L and not be seen, when the lighting device 40 is seen diagonally from the front left. However, the reflected images 11K and 21K can be seen by the light sources 11 and 21 on the left side in the drawing which may be reflected on a reflective surface 41RN of the right side wall portion 41R.

In this modified example, i.e., when the board 42 is arranged to be inclined with respect to the left side wall portion 41L and the right side wall portion 41R, it can also appear as though the light sources were arranged at equal intervals throughout the entire row when the lighting device 40 is seen diagonally from the front left or right by setting a distance D2 to be (⅓)×D1 or greater and (⅔)×D1 or less. By setting a distance S2 to be (⅓)×S1 or greater and (⅔)×S1 or less, it can appear as though the light sources were arranged at equal intervals throughout the entire column when the lighting device 40 is seen diagonally from the front and above or below.

Figure 11:
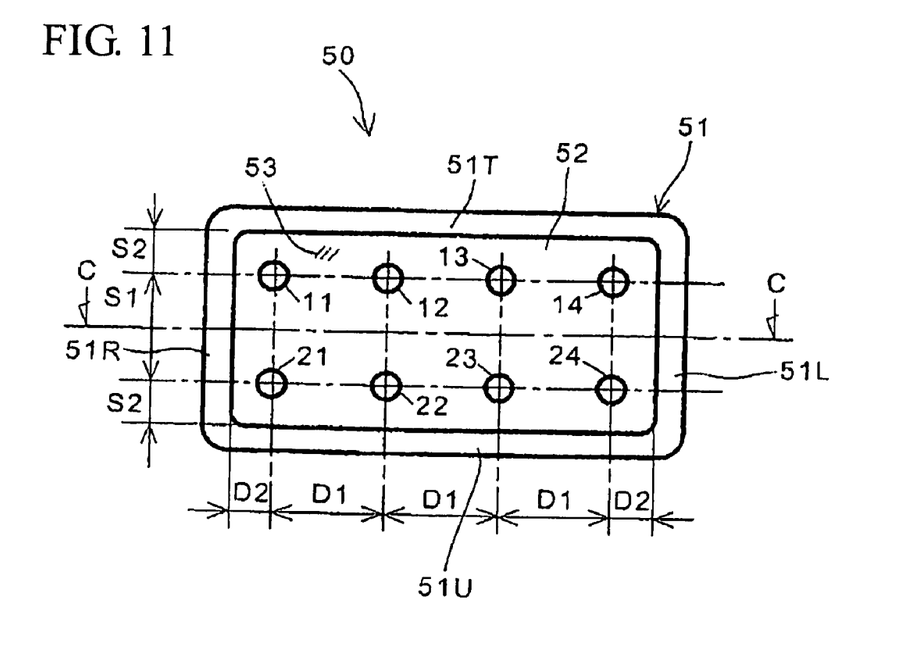
FIG. 11 is a front view of a lighting device according to a second modified example of one of the embodiments.
Figure 12:
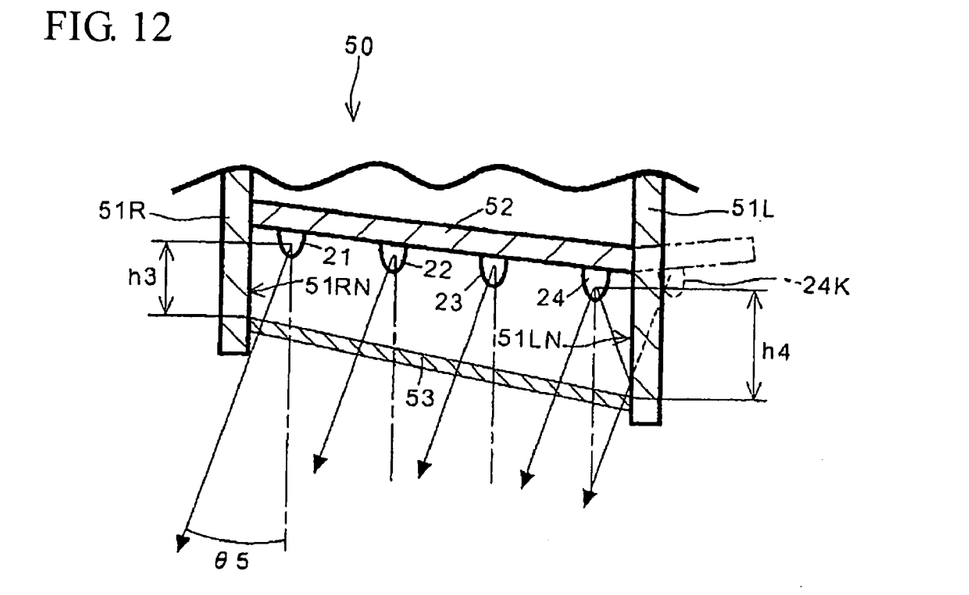
FIG. 12 is a sectional view taken along the line C-C of FIG. 11.

FIG. 11 illustrates a front view of a lighting device 50 according to a second modified example of the first embodiment discussed above. FIG. 12 illustrates a sectional view taken along the line C-C of FIG. 11. The same reference numerals as those described above denote the same or equivalent parts. A housing 51 can be formed of wall portions 51T, 51U, 51L, and 51R. Reflective surfaces can be formed in the respective four wall portions. In this modified example, not only can a board 52 be attached to be inclined with respect to the right side wall portion 51R and the left side wall portion 51L, but also a cover lens 53 can be attached to be inclined with respect to the right side wall portion 51 and the left side wall portion 51L. Accordingly, a distance h4 between the light source 14 or 24 and the cover lens 53 can be greater than a distance h3 between the light source 11 or 21 and the cover lens 53.

In this modified example, as illustrated in FIG. 12, the light sources 11 and 21 at the column ends on the left side in the drawing can still be seen when an angle formed by the lighting device 50 and the viewpoint of the viewer has reached an angle θ5. However, at this point, reflected images 14K and 24K can be seen by the light sources 14 and 24 at the column ends on the right side in the drawing being reflected on a reflective surface 51LN of the left side wall portion 51L. This may result in the viewer of the lighting device 50 to view a total of 10 light sources which is greater than the number arranged in the board. Therefore, viewability of the lighting device 50 can further be improved.

Even in this modified example, i.e., with a configuration in which the board 52 and the cover lens 53 can be arranged diagonally with respect to the left side wall portion 51L and the right side wall portion 51R, it can appear as though the light sources were arranged at equal intervals throughout the entire row when the lighting device 50 is seen diagonally from the front left or right by setting a distance D2 to be (⅓)×D1 or greater and (⅔)×D1 or less. Also, it can appear as though the light sources were arranged at equal intervals throughout the entire column when the lighting device 50 is seen diagonally from the front and above or below by setting a distance S2 to be (⅓)×S1 or greater and (⅔)×S1 or less. Note that it may be preferable to arrange the lighting devices 50 to be horizontally symmetrical in the width direction of the vehicle, since chances for the viewer to see a greater number of the light sources than the number arranged in the board can be increased.

Note that, in the embodiment described above and the above-mentioned modified embodiments of the embodiment described above, it can appear as though the light sources were arranged at equal intervals throughout the entire row and column when the lighting device is seen from diagonal directions by setting the distance S2 to be (⅓)×D1 or greater and (⅔)×D1 or less and setting the distance D2 to be (⅓)×S1 or greater and (⅔)×S1 or less.

Figure 13:
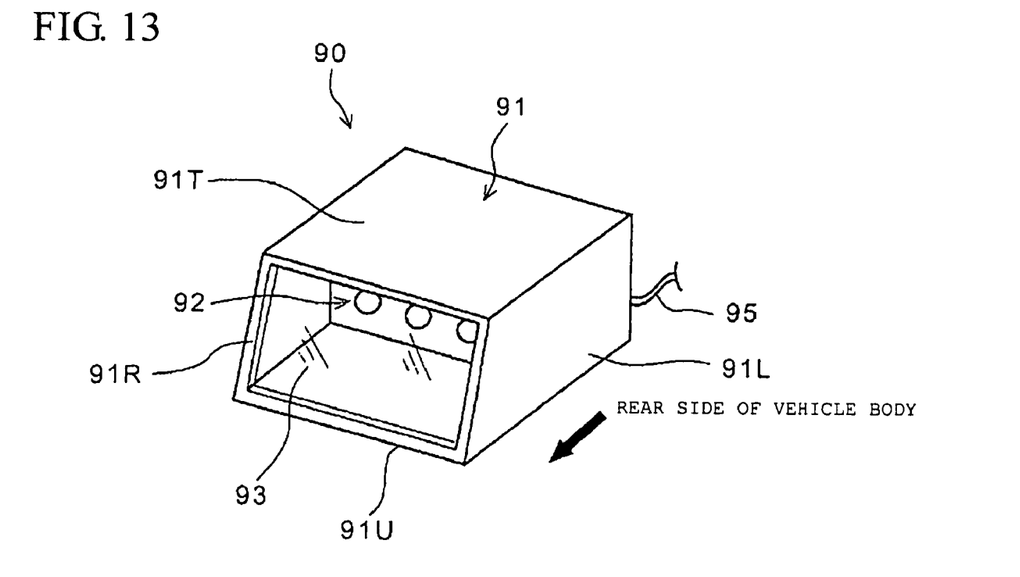
FIG. 13 is a perspective view of a lighting device according to another embodiment.
Figure 14:
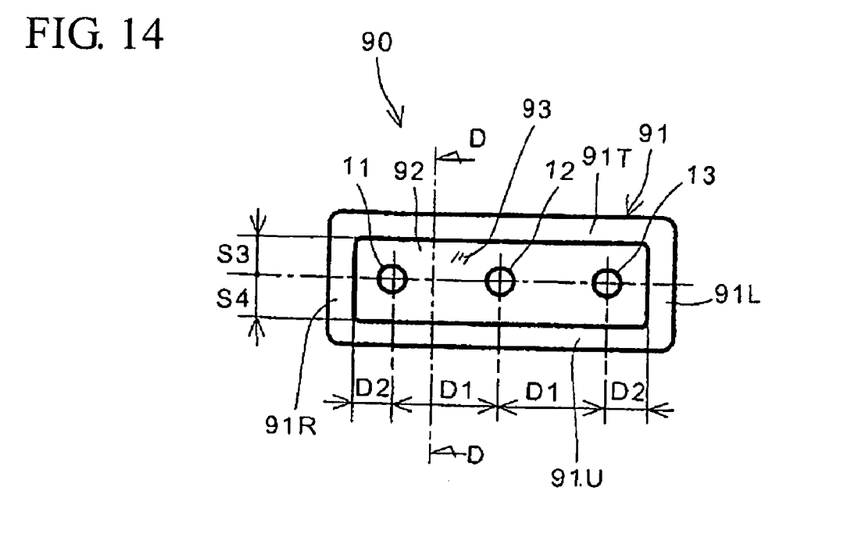
FIG. 14 is a front view of the lighting device.
Figure 15:
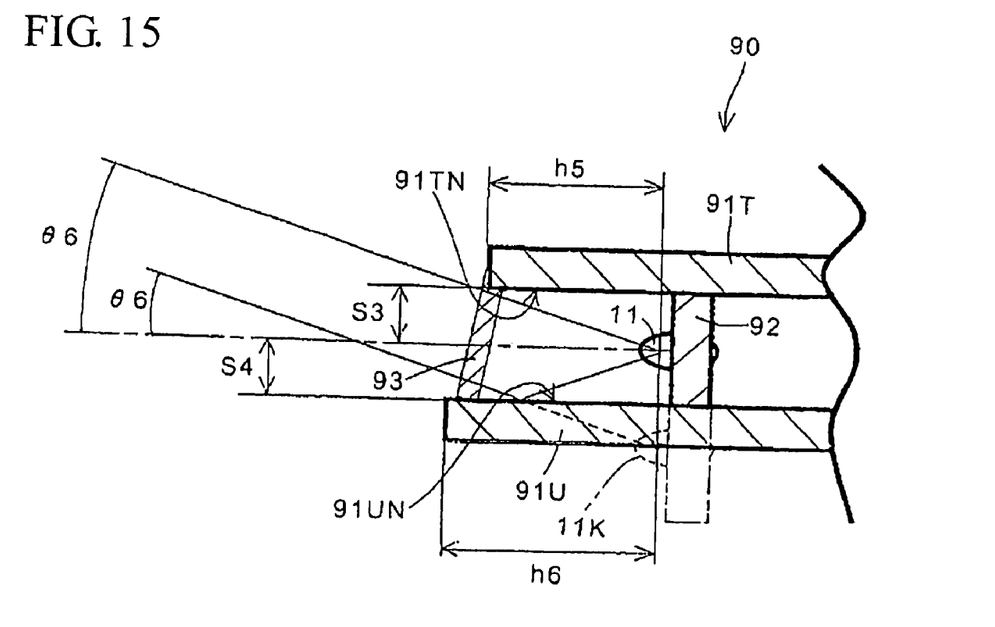
FIG. 15 is a sectional view taken along the line D-D of FIG. 14.

FIG. 13 illustrates a perspective view of the lighting device 90 according to another embodiment. FIG. 14 illustrates a front view of the lighting device 90 and FIG. 15 illustrates a sectional view taken along the line D-D of FIG. 14. The lighting device 90 can be configured such that a board 92, in which light sources 11, 12, and 13 may be arranged in one row by three columns, may be held in a housing 91. The housing 91 can be formed of an upper side wall portion 91T, a lower side wall portion 91U, a left side wall portion 91L, a right side wall portion 91R, and a rear side wall portion (not shown) which may be provided to surround the four sides of the board 92. The upper side wall portion 91T and the lower side wall portion 91U may form two horizontal surfaces facing each other vertically. The left side wall portion 91L and the right side wall portion 91R may form two vertical surfaces facing each other horizontally. This may result in the formation of a shape like a rectangular solid which is partly cut off at a plane orthogonal to the left side wall portion 91L and the right side wall portion 91R.

On the front side of the vehicle body of the housing 91, a colorless or colored transparent cover lens 93 can be attached. Note that a wire 95, which may supply power supply to the light sources, can be attached in the rear side wall portion of the housing 91.

In the lighting device 90, inner wall surfaces of parts bulging toward the side of the irradiation direction of the light sources from edge surfaces of the board 92 in the four wall portions 91T, 91U, 91L, and 91R can be reflective surfaces 91TN, 91UN, 91LN (not shown), and 91RN (not shown) which may reflect all light. The board 92 can be arranged to be orthogonal to the four wall portions. In this embodiment, the lengths of the two reflective surfaces vertically facing each other may differ in such a way that a distance h6 between an edge of the reflective surface 91UN on the lower side and the light source can be set to greater than a distance h5 between an edge of the reflective surface 91TN on the upper side and the light source.

In the board 92, the light sources 11, 12, and 13 formed of a total of three light-emitting diodes can be arrayed in a matrix of one row by three columns. The light sources in the same row can be arranged at equal intervals each having a distance D1. A distance between each light source at row ends and its adjacent reflective surface can be a distance D2. A distance between the reflective surface 91TN and each light source on the upper side can be a distance S3. A distance between the reflective surface 91UN and each light source on the lower side can be a distance S4. Note that, in this embodiment, the distance S3 and the distance S4 can be set to the same.

The lighting device 90 according to this embodiment may be configured such that both of the actual images of the light sources 11, 12, and 13 and reflected images thereof can be seen when seen from a position diagonally above where an angle formed by the lighting device 90 and the viewpoint of the viewer is an angle θ6. In order to achieve this, the distance h6 can be set to S3 or greater and h5 or greater. This is because an angle α, at which the actual image cannot be seen, can be an arctan(S3/h5) or greater and an angle β, at which the reflected image can be seen, can be an arctan(S4/h6) or greater, when the lighting device 90 is seen diagonally from above.

Furthermore, in the lighting device 90 according to this embodiment, an angle, at which the viewer frequently looks down on the lighting device 90, can be set to 30 degrees. The lighting device 90 may be configured such that both of the actual images and the reflected images of the light sources 11, 12, and 13 can reliably be seen at this time. In order to achieve this, the distance h5 can be set to S3×(√3) or less, and the distance h6 can be set to S4×(√3) or greater. This is because the distance h6 can be set to S4×(√3) or greater because arctan(S4/h6) may be 30 degrees or less. For the actual image of the light source to be seen at this time, the distance h5 may set to S3×(√3) or less because arctan(S3/h5) can be 30 degrees or greater.

Figure 16:
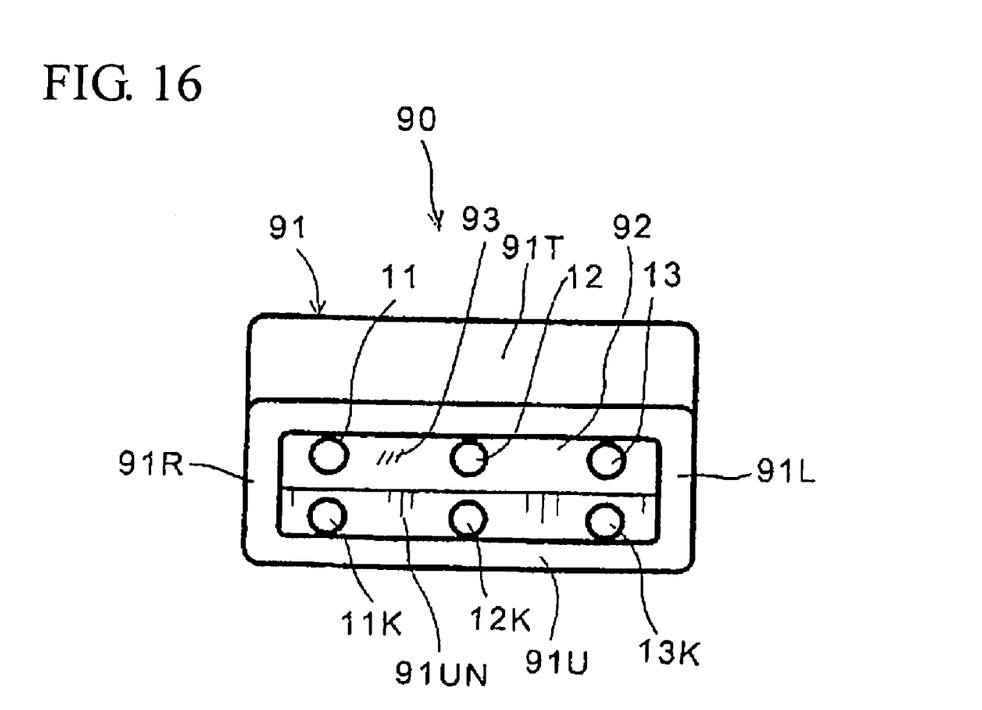
FIG. 16 is a perspective view showing how the lighting device is seen from a position diagonally above where the angle formed by the lighting device and the viewpoint of the viewer is an angle θ6.

FIG. 16 illustrates how the lighting device 90 can be seen from a position diagonally above where the angle formed by the lighting device 90 and the viewpoint of the viewer is the angle θ6 (30 degrees in this embodiment). In this case, the light sources 11, 12, and 13 can be seen, not only as actual images, but also as reflected images 11K, 12K, and 13K. The light sources 11, 12, and 13 may be seen by being reflected on the reflective surface 91UN of the lower side wall portion 91U. Thereby, it may appear to the viewer of the lighting device 90 as though the number of light sources was six which is twice the number arranged in the board.

Figure 17:
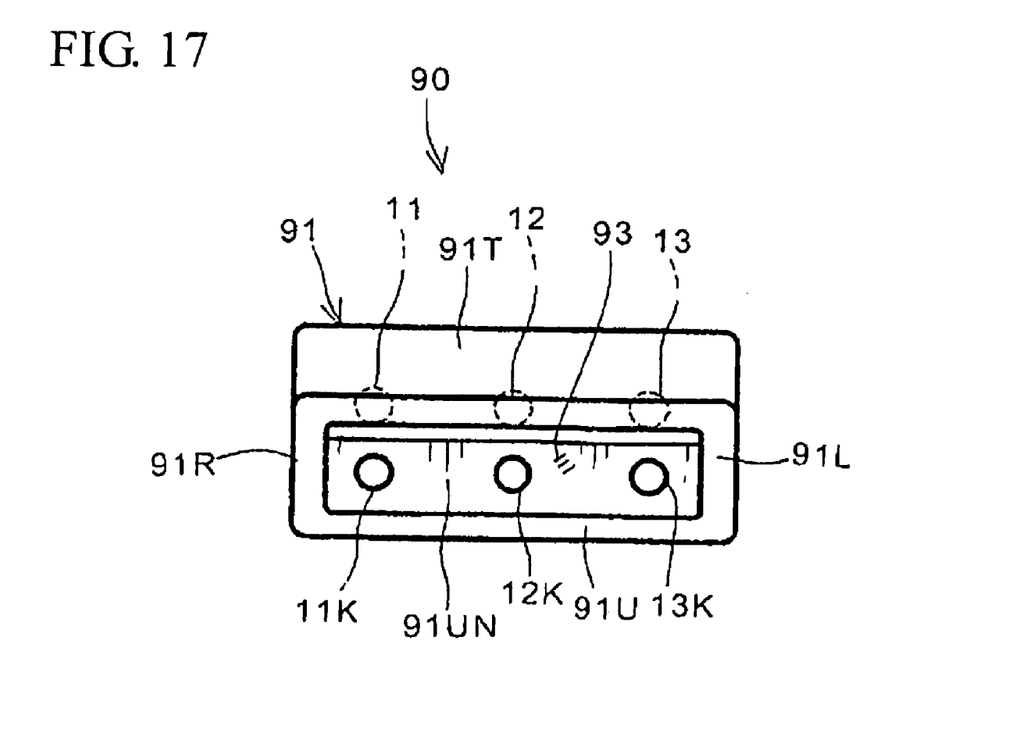
FIG. 17 is a perspective view showing how the lighting device is seen from a position where the angle formed by the lighting device and the viewpoint of the viewer is greater than the angle θ6.

FIG. 17 illustrates how the lighting device 90 may be seen from a position where the angle formed by the lighting device 90 and the viewpoint of the viewer is greater than the angle θ6. This may result in the light sources 11, 12, and 13 to be hidden by the upper side wall portion 91T and cannot be seen. However, since the reflected images 11K, 12K, and 13K can be seen as reflections from the reflective surface 91UN, it may appear to the viewer of the lighting device 90 as though the number of light sources was three which is the same number arranged in the board.

As described above, the viewability may considerably increase when the lighting device 90 according to the embodiment discussed above is seen diagonally from above. The viewability to an occupant in a subsequent vehicle can also particularly be improved when attached to the vicinity of a tail lamp device or the like, as shown in FIG. 1. Note that the lighting device 90 may be attached to the front side of the vehicle body or the like of the motorcycle 1 (see FIG. 1). For example, by attaching the lighting device 90 to the middle body portion or the like of the front fork 3 while the irradiation direction of the light source is directed toward the front side of the vehicle body, the inclination angle of an opening of the housing 91 can approximate the inclination angle of the front fork 3. This may result in the lighting device 90 to be arranged without a sense of discomfort in design.

Figure 18:
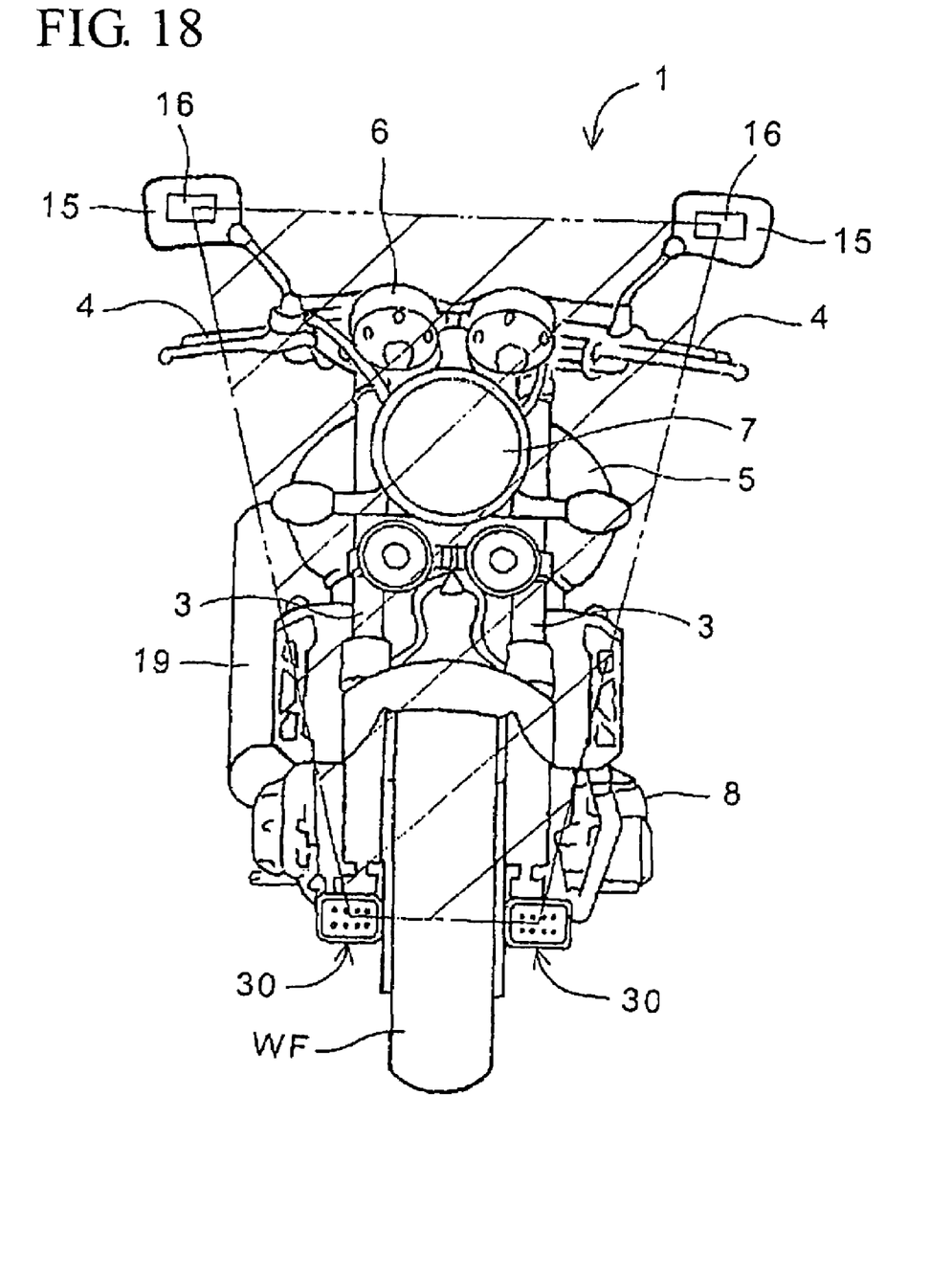
FIG. 18 is a front view of the motorcycle in which the lighting device is arranged according to some of the embodiments.

FIG. 18 illustrates a front view of the motorcycle 1 in which the lighting device 30 is arranged according to another embodiment. Position lamps 16 of the vehicle width or the like can be attached to a pair of left and right rearview mirrors 15 of the motorcycle 1 so that the irradiation directions thereof may be directed toward the front side of the vehicle body. In an example of the drawing, a pair of left and right lighting devices 30, according to the above-described embodiment, may be arranged in lower end portions of the front forks 3. With such arrangement positions of the lighting devices 30, the two position lamps 16 on the vehicle body upper side and the two lighting devices 30 on the vehicle body lower side may be arranged as four vertices to form a trapezoid (shaded portion in the drawing). Accordingly, irradiation points of the lamps may be dispersed in the vehicle-width direction and the vertical direction of the vehicle body. This may result in the improvement of the viewability of the motorcycle 1 for an occupant of another vehicle, a pedestrian, and the like.

Note that various other modifications can be possible regarding the arranged numbers and arrangement positions of the lighting device 30 according to some of the embodiments and the lighting device 90 according to some of the other embodiments. For example, the lighting device 90 according to some of the other embodiments may be arranged in the position of the lighting device 30, as illustrated in FIG. 18.

Note that the attachment position and attachment angle of the lighting device to the vehicle body, the shape and material of the housing of the lighting device, the shape and dimensional ratio of the wall portion of the housing, the number and arrangement of the light sources, the shape and arrangement of the board, and the like may not limited to those of the embodiment described above, and various modifications are possible. For example, a lighting device which is long in the vertical direction may be formed by arranging the light sources with a greater number of rows than the number of columns. Also, the lighting device as shown in some of the other embodiments may be used with the light sources arranged in the vertical direction in three rows by one column. Further, the housing of the lighting device may not limited to a quadrangle shown in the embodiments described above, and may be formed of a polygon such as a hexagon.

According to one embodiment, a vehicle lighting device includes a board in which multiple light sources can be arrayed. The vehicle lighting device includes wall portions which may be arranged to bulge in an irradiation direction of the light sources from edge surfaces of the board and may form a polygon surrounding the board. In the vehicle lighting device, at least one of the wall portions may have a reflective surface on a side facing the light sources.

According to another embodiment, the light sources may be arrayed in a matrix of m rows by N columns, and aforementioned reflective surfaces may be formed of two horizontal surfaces, which vertically face each other in a row direction of the matrix and two vertical surfaces, which horizontally face each other in a column direction of the matrix.

According to another embodiment, when the light sources in each row are arranged at equal intervals each having a distance D1 and when a distance between each of the light sources at both row ends and the reflective surface adjacent thereto is a distance D2, the distance D2 can be set to not less than (⅓)×D1 and not more than (⅔)×D1.

According to another embodiment, when the light sources in each column are arranged at equal intervals each having a distance S1 and when a distance between each of the light sources at both column ends and the reflective surface adjacent thereto is a distance S2, the distance S2 can be set to not less than (⅓)×S1 and not more than (⅔)×S1.

According to another embodiment, when the light sources in each row are arranged at equal intervals each having a distance D1 and when a distance between each of the light sources at both column ends and the reflective surface adjacent thereto is a distance S2, the distance S2 can be set to not less than (⅓)×D1 and not more than (⅔)×D1.

According to another embodiment, when the light sources in each column are arranged at equal intervals each having a distance S1 and when a distance between each of the light sources at both row ends and the reflective surface adjacent thereto is a distance D2, the distance D2 can be set to not less than (⅓)×S1 and not more than (⅔)×S1.

According to another embodiment, a distance between an edge of the reflective surface of one of the vertical surfaces and the light sources may differ from a distance between an edge of the reflective surface of the other one of the vertical surfaces and the light sources.

According to another embodiment, the board may be arranged to be inclined with respect to the two vertical surfaces.

According to another embodiment, the vehicle lighting device may include a board in which multiple light sources can be arrayed. The vehicle lighting device may include four wall portions, which can surround the board in an irradiation side of the light sources and each of which, or at least one of the light sources may have a reflective surface on a side facing the light sources. In the vehicle lighting device, the reflective surfaces can be formed of two horizontal surfaces, which vertically face each other in a row direction of a matrix, and two vertical surfaces, which horizontally face each other in a column direction of the matrix. The light sources can be arranged in the matrix of one row by N columns. The board can be arranged to be substantially orthogonal to the reflective surfaces. the distance h6 can be set to not less than S3 and h5, when a distance between an edge of an upper one of the horizontal reflective surfaces and the light sources is a distance h5, when a distance between an edge of a lower one of the horizontal reflective surfaces and the light sources is a distance h6, when a distance between the upper reflective surface and the light sources is a distance S3, and when a distance between the lower reflective surface and the light sources is a distance S4. The horizontal reflective surfaces may vertically face each other.

Furthermore, according to another embodiment, the distance h5 can be set to not more than $S3 \times (\sqrt{3})$, and the distance h6 can be set to not less than $S4 \times (\sqrt{3})$.

According to another embodiment, a board may be provided in which a plurality of light sources can be arrayed. The wall portions may be provided which can be arranged to bulge in the irradiation direction of the light sources from the edge surfaces of the board and to form the polygon surrounding the board. In the vehicle lighting device, at least one of the wall portions may have the reflective surface on a side facing the light sources. Thus, when the lighting device is seen from a diagonal direction having a predetermined angle with respect to the irradiation direction of the light source, a reflected image of the light source may be reflected on the reflective surface. As a result, the number of the light sources may appear to be greater than the actual number. This result in the improvement of viewability.

Since the wall portion can be used as the reflective surface, a reflective surface of a complex shape or the like does not need to be provided, and viewability of the lighting device can be improved with a simple structure. Furthermore, since the light sources with only one reflection by the reflective surface can be seen, there is less unevenness in the lighting and the product appearance is improved compared to a method by which the light sources are seen after multiple reflections.

According to another embodiment, the light sources may be arrayed in the matrix of m rows by N columns, and aforementioned reflective surfaces can include the two horizontal surfaces, which vertically face each other in the row direction of the matrix, and the two vertical surfaces, which horizontally face each other in the column direction of the matrix. Thus, when the lighting device is seen from a diagonal direction having a predetermined angle with respect to the irradiation direction of the light source, a part of the light sources arrayed in the matrix can be reflected on the reflective surface as reflected images. Accordingly, even when the lighting device is seen diagonally from an angle where a part of the light sources is blocked by the wall portion and cannot be seen, the reflected images of other light sources can be seen instead. Therefore, the light sources of the same number as that when seen from the front can be seen.

According to another embodiment, when the light sources in each row are arranged at equal intervals each having the distance D1 and when the distance between each of the light sources at both row ends and the reflective surface adjacent thereto is the distance D2, the distance D2 can be set to not less than (⅓)×D1 and not more than (⅔)×D1. Thus, when the lighting device is seen from a diagonal direction on the left or right having a predetermined angle with respect to the irradiation direction of the light source, the distance between the actual image of the light source at the row end and the reflected image of the actual image can approximate the distance D1.

Accordingly, when the lighting device is seen diagonally and the actual images and the reflected images of the light sources are seen, it may appear as though the light sources were arranged at equal intervals throughout the entire row, whereby the viewer does not feel a sense of incongruity.

According to another embodiment, when the light sources in each column are arranged at equal intervals each having the distance S1 and the distance between each of the light sources at both column ends and the reflective surface adjacent thereto is the distance S2, the distance S2 can be set to not less than (⅓)×S1 and not more than (⅔)×S1. Thus, when the lighting device is seen from a diagonal direction having a predetermined angle with respect to the irradiation direction of the light source, the distance between the actual image of the light source at the column end and the reflected image of the actual image can approximate the distance S1.

Accordingly, when the lighting device is seen diagonally and the actual images and the reflected images of the light sources are seen, it may appear as though the light sources were arranged at equal intervals throughout the entire column, whereby the viewer does not feel a sense of incongruity.

According to another embodiment, when the light sources in each row are arranged at equal intervals each having the distance D1 and the distance between each of the light sources at both column ends and the reflective surface adjacent thereto is the distance S2, the distance S2 can be set to not less than $(1/3) \times D1$ and not more than $(2/3) \times D1$. Thus, when the lighting device is seen from a diagonal direction having a predetermined angle with respect to the irradiation direction of the light source, the distance between the actual image of the light source at the column end and the reflected image of the actual image can approximate the distance D1.

Accordingly, when the lighting device is seen diagonally and the actual images and the reflected images of the light sources are seen, it may appear as though the light sources were arranged at equal intervals throughout the entire column, whereby the viewer does not feel a sense of incongruity.

According to another embodiment, when the light sources in each column are arranged at equal intervals each having the distance S1 and the distance between each of the light sources at both row ends and the reflective surface adjacent thereto is the distance D2, the distance D2 can be set to not less than $(1/3) \times S1$ and not more than $(2/3) \times S1$. Thus, when the lighting device is seen from a diagonal direction having a predetermined angle with respect to the irradiation direction of the light source, the distance between the actual image of the light source at the row end and the reflected image of the actual image can approximate the distance S1.

Accordingly, when the lighting device is seen diagonally and the actual images and the reflected images of the light sources are seen, it may appear as though the light sources were arranged at equal intervals throughout the entire row, whereby the viewer does not feel a sense of incongruity.

According to another embodiment, the distance between the edge of the reflective surface of one of the vertical surfaces and the light sources may differ from the distance between the edge of the reflective surface of the other one of the vertical surfaces and the light sources. Thus, how the lighting device is seen diagonally from the front left or right can be made to differ between the left and right.

According to another embodiment, the board may be arranged to be inclined with respect to the two vertical surfaces. Thus, how the lighting device is seen diagonally from the front left or right can be made to differ between the left and right. Particularly, when seen from one side of the left or right at a predetermined angle, the lighting device can be configured such that the number of light sources may appear to be greater than the actual number.

According to another embodiment, the light sources can be arrayed in the matrix of one row by N columns. The board can be arranged to be substantially orthogonal to the reflective surfaces. The distance h6 can be set to not less than S3 and h5, when the distance between the edge of the upper one of the horizontal reflective surfaces and the light sources is the distance h5, when the distance between the edge of the lower one of the horizontal reflective surfaces and the light sources is the distance h6, when the distance between the upper reflective surface and the light sources is the distance S3, and when the distance between the lower reflective surface and the light sources is the distance S4. The horizontal reflective surfaces may vertically face each other. Thus, when looked down diagonally from above at a predetermined angle with respect to the irradiation direction of the light source, the lighting device can be configured such that the actual image and the reflected image of the actual image of the light source can be seen simultaneously.

Accordingly, when the lighting device is looked down diagonally from above, the number of the light sources may appear to be greater than the actual number, and viewability of the lighting device can be improved.

According to another embodiment, the distance h5 can be set to not more than $S3 \times (\sqrt{3})$, and the distance h6 is set to not less than $S4 \times (\sqrt{3})$. Thus, when looked down from above at an angle of 30 degrees with respect to the irradiation direction of the light source, the lighting device can be configured such that the actual image and the reflected image of the actual image of the light source can be seen simultaneously. Accordingly, the number of the light sources may appear to be greater than the actual number, and viewability of the lighting device can be improved. Also, the lighting device can be configured such that the actual image and the reflected image of the actual image of the light source can be seen simultaneously while minimizing the length from the edge of the reflective surface to the light source.

The above-described embodiments are not the only form of the vehicle lighting device according to some of the embodiments discussed. In addition, various other configurations can be employed for vehicle lighting device without departing from the spirit and scope of the embodiments discussed herein.

EXPLANATION OF THE REFERENCE NUMERALS

1 . . . MOTORCYCLE,
11, 12, 13, 14, 21, 22, 23, 24 . . . LIGHT SOURCE,
30 . . . LIGHTING DEVICE (FIRST EMBODIMENT),
31 . . . HOUSING,
31T . . . UPPER SIDE WALL PORTION,
31U . . . LOWER SIDE WALL PORTION,
31L . . . LEFT SIDE WALL PORTION,
31R . . . RIGHT SIDE WALL PORTION,
31TN, 31UN, 31LN, 31LR . . . REFLECTIVE SURFACE,
32 . . . BOARD,
33 . . . COVER LENS,
90 . . . LIGHTING DEVICE (SECOND EMBODIMENT),
91 . . . HOUSING,
91T . . . UPPER SIDE WALL PORTION,
91U . . . LOWER SIDE WALL PORTION,
91L . . . LEFT SIDE WALL PORTION,
91R . . . RIGHT SIDE WALL PORTION,
91TN, 91UN . . . REFLECTIVE SURFACE,
92 . . . BOARD,
93 . . . COVER LENS

We claim:

1. A vehicle lighting device, comprising:
    a board comprising a plurality of light sources to form an array; and
    wall portions configured to bulge in an irradiation direction of the light sources from edge surfaces of the board and to form a polygon surrounding the board,
    wherein at least one of the wall portions comprises a reflective surface on a side facing the light sources.

2. The vehicle lighting device according to claim 1, wherein the light sources are arrayed in a matrix of m rows by N columns, and
    wherein the reflective surface comprises
        two horizontal surfaces which vertically face each other in a row direction of the matrix, and two vertical surfaces which horizontally face each other in a column direction of the matrix.

3. The vehicle lighting device according to claim 2, wherein a distance D2 is set to not less than (⅓)×a distance D1 and not more than (⅔)×the distance D1, when the light sources in each row are arranged at equal intervals each having the distance D1 and when a distance between each of the light sources at both row ends and the reflective surface adjacent thereto is the distance D2.

4. The vehicle lighting device according to claim 2, wherein a distance S2 is set to not less than (⅓)×a distance S1 and not more than (⅔)×the distance S1, when the light sources in each column are arranged at equal intervals each having the distance S1 and when a distance between each of the light sources at both column ends and the reflective surface adjacent thereto is the distance S2.

5. The vehicle lighting device according to claim 2, wherein a distance S2 is set to not less than (⅓)×a distance D1 and not more than (⅔)×a distance D1, when the light sources in each row are arranged at equal intervals each having the distance D1 and when a distance between each of the light sources at both column ends and the reflective surface adjacent thereto is the distance S2.

6. The vehicle lighting device according to claim 2, wherein a distance D2 is set to not less than (⅓)×a distance S1 and not more than (⅔)×a distance S1, when the light sources in each column are arranged at equal intervals each having the distance S1 and when a distance between each of the light sources at both row ends and the reflective surface adjacent thereto is the distance D2.

7. The vehicle lighting device according to claim 2, wherein a distance between an edge of the reflective surface of one of the vertical surfaces and the light sources differs from a distance between an edge of the reflective surface of the other one of the vertical surfaces and the light sources.

8. The vehicle lighting device according to claim 7, wherein the board is configured to be inclined with respect to the two vertical surfaces.

9. A vehicle lighting device, comprising:
a board comprising a plurality of light sources to form an array; and
four wall portions to surround the board in an irradiation side of the light sources and to comprise a reflective surface on a side facing the plurality of light sources,
wherein each of the light sources are configured to be arrayed in a matrix of one row by N columns,
the reflective surface comprises
two horizontal surfaces which vertically face each other in a row direction of the matrix, and
two vertical surfaces which horizontally face each other in a column direction of the matrix,
the board is configured to be substantially orthogonal to the reflective surfaces, and
a distance h6 is set to not less than a distance S3 and a distance h5, when a distance between an edge of an upper one of the horizontal reflective surfaces and the light sources is the distance h5, when a distance between an edge of a lower one of the horizontal reflective surfaces and the light sources is the distance h6, when a distance between the upper reflective surface and the light sources is the distance S3, and when a distance between the lower reflective surface and the light sources is a distance S4,
the horizontal reflective surfaces vertically face each other.

10. The vehicle lighting device according to claim 9, wherein the distance h5 is set to not more than $S3\times(\sqrt{3})$, and wherein the distance h6 is set to not less than $S4\times(\sqrt{3})$.

11. A vehicle lighting method, comprising:
providing a board comprising a plurality of light sources to form an array;
configuring wall portions to bulge in an irradiation direction of the light sources from edge surfaces of the board and to form a polygon surrounding the board; and
configuring at least one of the wall portions to comprise a reflective surface on a side facing the plurality of light sources.

12. The vehicle lighting method according to claim 11, further comprising:
providing the plurality of light sources in a matrix of m rows by N columns; and
configuring the reflective surface to comprise
two horizontal surfaces which vertically face each other in a row direction of the matrix, and
two vertical surfaces which horizontally face each other in a column direction of the matrix.

13. The vehicle lighting method according to claim 12, further comprising:
setting a distance D2 to not less than (⅓)×a distance D1 and not more than (⅔)×the distance D1, when the light sources in each row are arranged at equal intervals each having the distance D1 and when a distance between each of the light sources at both row ends and the reflective surface adjacent thereto is the distance D2.

14. The vehicle lighting method according to claim 12, further comprising:
setting a distance S2 to not less than (⅓)×a distance S1 and not more than (⅔)×the distance S1, when the light sources in each column are arranged at equal intervals each having the distance S1 and when a distance between each of the light sources at both column ends and the reflective surface adjacent thereto is the distance S2.

15. The vehicle lighting method according to claim 12, further comprising:
setting a distance S2 to not less than (⅓)×a distance D1 and not more than (⅔)×a distance D1, when the light sources in each row are arranged at equal intervals each having the distance D1 and when a distance between each of the light sources at both column ends and the reflective surface adjacent thereto is the distance S2.

16. The vehicle lighting method according to claim 12, further comprising:
setting a distance D2 to not less than (⅓)×a distance S1 and not more than (⅔)×a distance S1, when the light sources in each column are arranged at equal intervals each having the distance S1 and when a distance between each of the light sources at both row ends and the reflective surface adjacent thereto is the distance D2.

17. The vehicle lighting method according to claim 12, further comprising:
providing a distance between an edge of the reflective surface of one of the vertical surfaces and the light sources to differ from a distance between an edge of the reflective surface of the other one of the vertical surfaces and the light sources.

18. The vehicle lighting method according to claim 17, further comprising:
configuring the board to be inclined with respect to the two vertical surfaces.

19. A vehicle lighting method, comprising:
providing a board to comprise a plurality of light sources to form an array;
surrounding the board with four wall portions in an irradiation side of the light sources, each of the four wall portions comprise a reflective surface on a side facing the plurality of light sources;
configuring the plurality of light sources to be in a matrix of one row by N columns;
providing the reflective surface to comprise
two horizontal surfaces which vertically face each other in a row direction of the matrix, and
two vertical surfaces which horizontally face each other in a column direction of the matrix;
configuring the board to be substantially orthogonal to the reflective surfaces;
setting the distance h6 is set to not less than S3 and h5, when a distance between an edge of an upper one of the horizontal reflective surfaces and the light sources is the distance h5, when a distance between an edge of a lower one of the horizontal reflective surfaces and the light sources is the distance h6, when a distance between the upper reflective surface and the light sources is the distance S3, and when a distance between the lower reflective surface and the light sources is a distance S4; and
facing the horizontal reflective surfaces vertically to each other.

20. The vehicle lighting method according to claim 19, further comprising:
setting the distance h5 to not more than $S3 \times (\sqrt{3})$; and
setting the distance h6 to not less than $S4 \times (\sqrt{3})$.

21. A vehicle lighting device, comprising:
board means for providing a board comprising a plurality of light sources to form an array; and
wall portion means for providing wall portions configured to a bulge in an irradiation direction of the light sources from edge surfaces of the board and to form a polygon surrounding the board,
wherein at least one of the wall portions comprise a reflective surface on a side facing the plurality of light sources.

22. The vehicle lighting device according to claim 21,
wherein the plurality of light sources are arrayed in a matrix of m rows by N columns, and
the reflective surface comprise
two horizontal surfaces which vertically face each other in a row direction of the matrix, and
two vertical surfaces which horizontally face each other in a column direction of the matrix.

23. The vehicle lighting device according to claim 22, further comprising:
setting means for setting a distance D2 to not less than ($\frac{1}{3}$)×a distance D1 and not more than ($\frac{2}{3}$)×the distance D1, when the light sources in each row are arranged at equal intervals each having the distance D1 and when a distance between the plurality of the light sources at both row ends and the reflective surface adjacent thereto is the distance D2.

24. The vehicle lighting device according to claim 22, further comprising:
setting means for setting a distance S2 to not less than ($\frac{1}{3}$)×a distance S1 and not more than ($\frac{2}{3}$)×the distance S1, when the light sources in each column are arranged at equal intervals each having the distance S1 and when a distance between each of the light sources at both column ends and the reflective surface adjacent thereto is the distance S2.

25. The vehicle lighting device according to claim 22, further comprising:
setting means for setting a distance S2 to not less than ($\frac{1}{3}$)×a distance D1 and not more than ($\frac{2}{3}$)×a distance D1, when the light sources in each row are arranged at equal intervals each having the distance D1 and when a distance between each of the light sources at both column ends and the reflective surface adjacent thereto is the distance S2.

26. The vehicle lighting device according to claim 22, further comprising:
setting means for setting a distance D2 to not less than ($\frac{1}{3}$)×a distance S1 and not more than ($\frac{2}{3}$)×a distance S1, when the light sources in each column are arranged at equal intervals each having the distance S1 and when a distance between each of the light sources at both row ends and the reflective surface adjacent thereto is the distance D2.

27. The vehicle lighting device according to claim 22, wherein a distance between an edge of the reflective surface of one of the vertical surfaces and the light sources differs from a distance between an edge of the reflective surface of the other one of the vertical surfaces and the light sources.

28. The vehicle lighting device according to claim 27, wherein the board means for providing the board is configured to be inclined with respect to the two vertical surfaces.

29. A vehicle lighting device, comprising:
board means for providing a board comprising a plurality of light sources to form an array;
four wall portion means for surrounding the board in an irradiation side of the light sources and each of the four wall portions means comprise a reflective surface on a side facing the light sources; and
light source means for configuring the plurality of light sources to be in a matrix of one row by N columns, wherein
the reflective surface comprises
two horizontal surfaces which vertically face each other in a row direction of the matrix, and
two vertical surfaces which horizontally face each other in a column direction of the matrix,
wherein the board is configured to be substantially orthogonal to the reflective surfaces, and
wherein a distance h6 is set to not less than a distance S3 and a distance h5, when a distance between an edge of an upper one of the horizontal reflective surfaces and the light sources is the distance h5, when a distance between an edge of a lower one of the horizontal reflective surfaces and the light sources is the distance h6, when a distance between the upper reflective surface and the light sources is the distance S3, and when a distance between the lower reflective surface and the light sources is a distance S4, the horizontal reflective surfaces vertically face each other.

30. The vehicle lighting device according to claim 29,
wherein the distance h5 is set to not more than $S3 \times (\sqrt{3})$, and
wherein the distance h6 is set to not less than $S4 \times (\sqrt{3})$.

* * * * *